July 13, 1937. W. A. HYDE Re. 20,444

IMPREGNATION OF ARTICLES BY CENTRIFUGAL MEANS

Original Filed May 29, 1931 2 Sheets-Sheet 1

INVENTOR:
William A. Hyde
BY Owen R. Kennedy
Attorney

July 13, 1937. W. A. HYDE Re. 20,444

IMPREGNATION OF ARTICLES BY CENTRIFUGAL MEANS

Original Filed May 29, 1931 2 Sheets-Sheet 2

Inventor:
William A. Hyde.
By Owen W. Kennedy
Attorney

Reissued July 13, 1937 Re. 20,444

UNITED STATES PATENT OFFICE 20,444

IMPREGNATION OF ARTICLES BY CENTRIFUGAL MEANS

William A. Hyde, Worcester, Mass., assignor to Leon J. Barrett, Worcester, Mass.

Original No. 1,981,453, dated November 20, 1934, Serial No. 540,960, May 29, 1931. Application for reissue December 9, 1935, Serial No. 53,679

6 Claims. (Cl. 21—24)

The present invention relates to an improved method and means for impregnating articles of various kinds through the action of centrifugal force on a rotating body of liquid in which the articles to be impregnated are submerged.

The practice of the method contemplated by the present invention is characterized by the development of hydrostatic pressure in a rotating body of liquid surrounding the articles through the action of centrifugal force. As a result of the pressure acting radially with respect to the axis of rotation of the body of liquid, the liquid is forced through the articles, thereby expelling air from the interior of the articles, and resulting in more complete impregnation than has been heretofore obtained by any other means. The invention also contemplates the building up of a pulsating pressure in the liquid due to reactions developed in the rotating container for the body of liquid, whereby more effective impregnation is obtained, and the above and other advantageous features will more fully appear from the following description with reference to the accompanying drawings, in which:—

Like reference characters refer to like parts in the different figures.

Figure 1:
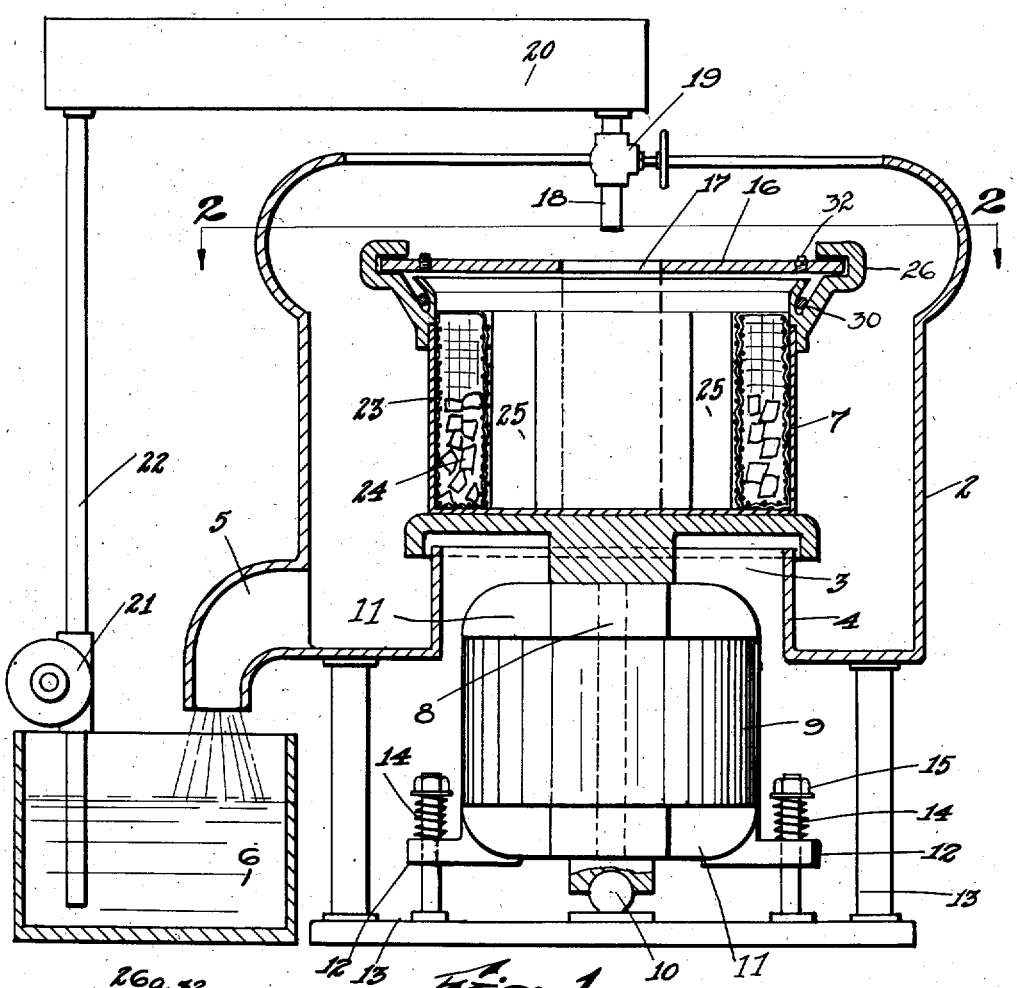
Fig. 1 is a side elevational view, partially diagrammatic, illustrating the apparatus for carrying out the invention.

Referring first to Fig. 1, there is shown an illustrative embodiment of apparatus for carrying out the invention, although as will hereinafter appear, other types of similar apparatus may be employed without departing from the principle underlying the invention. The apparatus consists of a base 1 supporting a hollow cylindrical casing 2, the bottom of which provides a central opening 3 surrounded by an upwardly extending flange 4. Liquid collecting at the bottom of the casing 2 will be retained by the flange 4, and may be withdrawn from the casing 2 through a passage 5 leading to a storage tank 6, the purpose of which will hereinafter appear.

Figure 2:
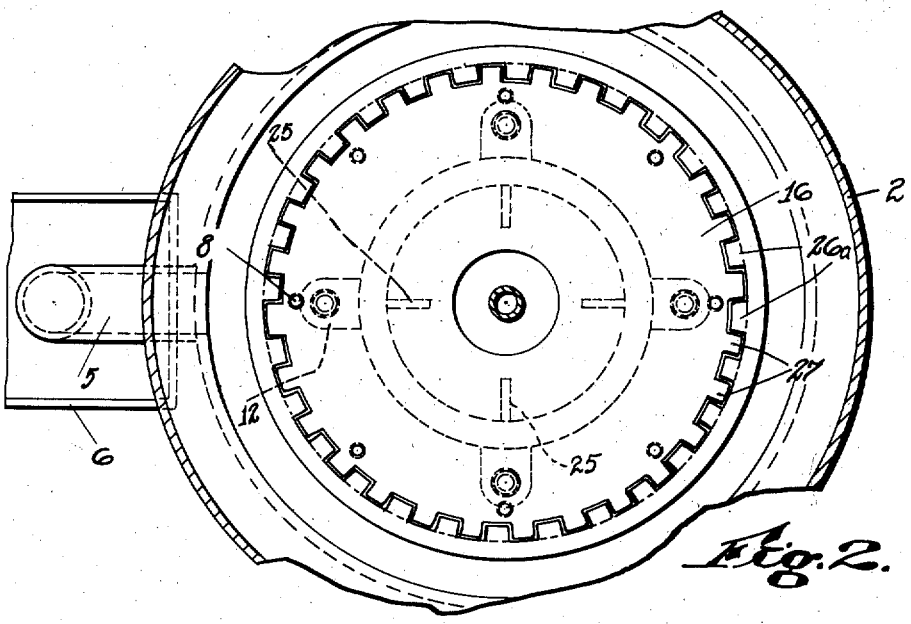
Fig. 2 is a horizontal sectional view along the line 2—2 of Fig. 1, looking in the direction of the arrows.
Figure 6:
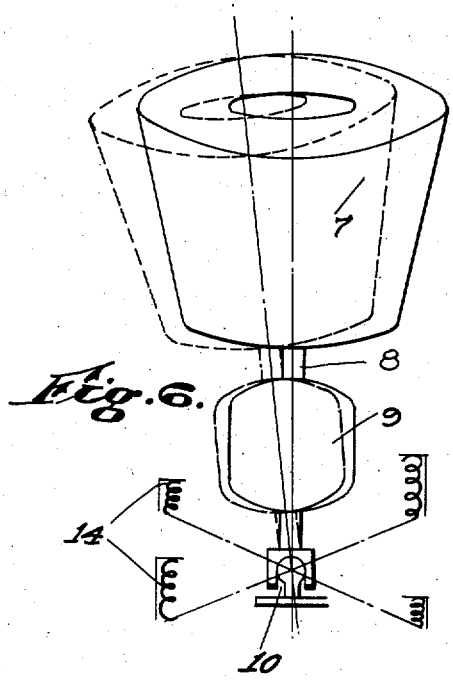
Figs. 5 and 6 are diagrammatic views, in perspective, illustrating the manner of obtaining a pulsating effect in the pressure developed within the liquid container.

A hollow bowl 7 is rotatably supported within the surrounding casing 2 by a shaft 8 extending through the opening 3 and spaced from the flange 4, the shaft 8 being adapted to be driven by means of a motor 9. Preferably the bowl 7 and its driving motor 9 constitute a unit, the entire weight of which is supported by a ball and socket bearing 10 provided by the base 1, the shaft 8 being rotatable in bearings carried by the motor frame members 11, which in turn transmit the weight of the whole unit to the ball and socket bearing 10. Consequently, the entire unit, including the rotatable bowl 7 and driving motor 9, is adapted to swing about the bearing 10 in the manner of an inverted pendulum. In order to support the bowl and motor unit in a substantially vertical position, the lower motor frame member 11 provides a number of lugs 12, 12 each providing an opening for loosely receiving a stud 13 projecting upwardly from the base 1. That portion of each stud 13 extending above the lug 12 is surrounded by a spring 14 and nuts 15 serve to hold the springs 14 on the studs 13 in engagement with the lugs 12. As indicated in dotted lines in Fig. 2, the motor frame member 11 provides four lugs 12 arranged diametrically and the several springs 14 pressing downwardly on the lugs 12 serve to maintain the entire bowl and motor structure in an upright position on the bearing 10. While the combined pressure of the springs 14 tends to maintain the axis of the bowl unit vertical, it is evident that owing to the compressibility of the springs 14 it is possible for the bowl 7 to have a swaying movement about the bearing 10 as a center in response to unbalanced forces set up during rotation of the bowl at high speeds. This swaying of the bowl is necessarily uniform, or periodic, in character, owing to the symmetrical arrangement of the springs 14 about the axis of the bearing 10, the tension of the springs 14 as determined by the nuts 15 serving to control, or limit, the amplitude of such periodic swaying movements, for a purpose which will hereinafter appear.

The bowl 7 provides a cover 16 having a central opening 17 to which fluid is adapted to be supplied from a pipe 18 having a control valve 19. Fluid is supplied to the pipe 18 from any suitable source, and a convenient way of keeping the pipe continuously supplied with impregnating fluid without appreciable loss in the system is illustrated more or less diagrammatically in Fig. 1. In this arrangement, a tank 20 mounted above the bowl 7 is adapted to supply fluid by gravity to the pipe 18, and the tank 20 is adapted to be kept at least partially filled by means of a pump 21 located in the lower tank 6 and adapted to force fluid upwardly into the tank 20 through a pipe 22. Consequently, any leakage of the impregnating fluid from the bowl 7 is collected by the surrounding casing 2 and delivered into the lower tank 6 through the passage 5, so that a circulation of liquid is maintained under the control of the valve 19 in the supply pipe 18.

In carrying out the invention with the above described apparatus, the cover 16 of the bowl 7 is removed and an annular cage 23 containing the articles 24 to be impregnated is positioned within the bowl 7 and the cover 16 replaced. The outside diameter of the cage 23 is substantially equal to the inside diameter of the bowl 7, so that the cage is substantially coaxial with the bowl. The cage 23 is preferably composed of open work material such as wire mesh, so that the walls of the cage offer substantially no resistance to the passage of liquid therethrough. The inside diameter of the cage 23 is considerably greater than the diameter of the opening 17 in the cover 16 and a number of radial blades 25 are provided by the bowl 7 within the surrounding cage 23, the purpose of which is to cause the liquid to start and stop with the bowl.

The cage 23 having been placed in position and the cover 16 closed, the valve 19 is opened and the machine started in operation. As the bowl 7 rotates with increasing speed, centrifugal force acting radially outward from the axis of rotation presses the liquid against the solid wall of the bowl 7. Therefore, by the time the bowl is up to speed, the liquid will tend to assume the dotted line position shown in Fig. 1 with a clear space in the middle of the bowl determined by the diameter of the opening 17 in the cover 16, around the edges of which excess fluid escapes into the casing 2 as the pressure builds up within the bowl.

Considering now the articles 24 within the open work cage 23, it is evident that they will be subjected to a hydrostatic pressure which is at its maximum at the solid wall of the bowl 7, the pressure decreasing inwardly towards the axis of rotation. With a given speed for a bowl of given radius, it has been found that a pressure as high as 60 pounds per square inch will be developed at the wall of the bowl 7, while a reduced pressure will be developed at the inner edge of the cage 23, depending on its width. Therefore, as the bowl rotates, all of the articles 24 within the cage 23 are positioned in the zone of greatest hydrostatic pressure near the wall of the bowl so that as rotation continues, the liquid is forced completely through the articles 24, at a rate depending upon the speed of rotation, the radius of the cage, the density or fluidity of the liquid and the permeability of the articles. As the impregnation of the articles progresses, any tendency for light articles to move inwardly towards the rotational axis is resisted by the confining cage 23, although obviously any air therein will be expelled toward the center of the bowl, such expelled air finally escaping into the central space below the cover opening 17.

As previously pointed out, the entire rotating unit, including the bowl 7 and its driving motor, is capable of swaying about a vertical axis passing through the bearing 10, and it has been found that the amplitude of this swaying movement can be controlled to cause the articles in the bowl to be subjected to pulsating pressure. As set forth above, the hydro-static pressure developed within the bowl 7 when the latter is rotating at a given speed, is dependent upon the radial distance of any point under consideration from the axis of the bowl. Therefore, any swaying movement of the bowl 7 during rotation will have the effect of slightly varying the distance of any point considered from the axis of rotation, thereby resulting in pressure variations at this point with a decided increase in the impregnating effect of the liquid on the articles 24. The manner in which this periodic pulsating effect is subject to variation will next be considered.

Figure 5:
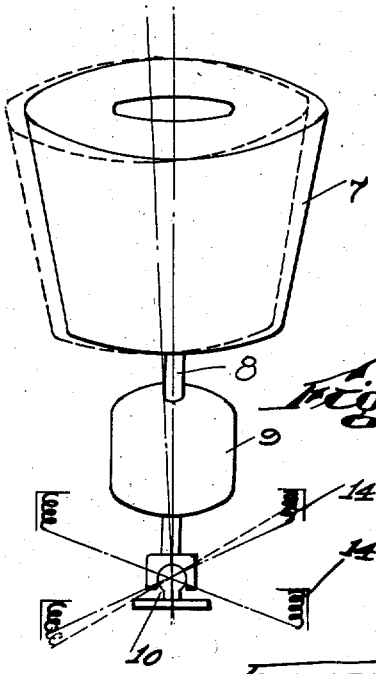

It is evident from a consideration of Fig. 1 that the rotating bowl 7 unit is in the nature of an inverted pendulum, and with the bowl stationary, it is obvious that a force exerted on the bowl 7 will cause it to oscillate about the bearing 10, with the springs 14 finally restoring the bowl to its upright position. Now assuming that the bowl is rotated with a load in the cage 23 somewhat unequally distributed, it follows that as the center of gravity of the load comes toward one spring 14, it tends to extend it and to compress the spring diametrically opposite, as indicated diagrammatically in Fig. 5. The reaction of a compressed spring 14 tends to compress the spring displaced 90° therefrom, depending on the direction of rotation, which action is repeated by the other springs, and there is thus imparted to the bowl a series of impulses toward and away from the axis of rotation. Obviously, the amplitude of these impulses is dependent upon the strength of the springs or their inital compression by the nuts 15, and if all of the springs are initially compressed to a considerable degree, the pulsations of the bowl can be reduced to a minimum. On the other hand, if the compression in one pair of diametrically opposed springs 14 be lessened, there results a tendency to increase the inclination of the bowl axis as it rotates, so that for a given speed of rotation a uniform swaying movement periodic in its nature will be imparted to the bowl with a resulting pulsation of pressure in the bowl to accelerate the impregnating effect of the liquid on the articles.

Figure 4:
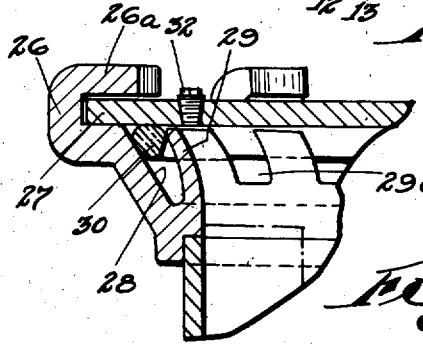
Figs. 3 and 4 are fragmentary views, partially in section, illustrating the manner of sealing the rotating container in Fig. 1.
Figure 3:
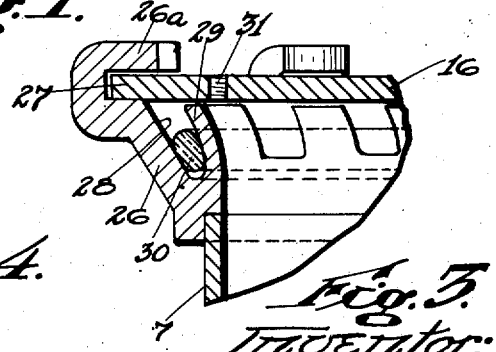

Referring now to Figs. 3 and 4, there is shown in detail an improved arrangement for providing a liquid tight seal between the cover 16 and the rim of the bowl 7. This cover 16 is removable from the bowl 7 to permit the placing of the article cage 23 therein, and in order to readily lock the cover 17 in position, the rim of the bowl 7 provides a locking ring 26 having a plurality of spaced lugs 26*a*. The outer periphery of the cover in turn provides a plurality of spaced teeth 27 of such width as to fit between the locking lugs 26*a*, see Fig. 2. By a turning movement of the cover 16, the teeth 27 are adapted to be positioned under the overhanging lugs 26*a*, thereby effectively holding the cover 16 in position. The details of this construction form no part of the present invention and are fully shown and described in the co-pending application of Leon J. Barrett and Norman F. Holter, Serial No. 471,263, filed July 28, 1930, since issued as Patent No. 1,930,706, October 17, 1933.

While the above described arrangement for locking the cover 16 in position on the bowl 7 effectively prevents accidental removal of the cover 16 while the bowl is rotating, it does not provide a liquid tight seal under the high pressures developed within the bowl 7, and the present invention contemplates an extremely effective arrangement for providing a liquid tight seal between the bowl and the cover. To this end, the ring 26 carrying the locking lugs 26a provides a beveled surface 28 opposed to an outwardly flaring lip 29 having notches 29a therein. There is thus provided an annular space between the lip 29 and the ring 26, in which is received a sealing ring 30, preferably composed of compressible material such as rubber, leather, or other suitable material. When the bowl 7 is filled with liquid and rotated at high speed, some of the liquid passes through the notches 29a in the lip 29, thereby exerting a pressure on the under side of the sealing ring 30, which tends to wedge the ring tightly between the opposed surfaces of the ring face 28 and the lip 29. Centrifugal force also tends to carry the sealing ring 30 upwardly and the wedging of the ring 30 increases as the pressure builds up in the bowl 7. Consequently, while there may be some initial flow of liquid past the ring 30 at low speed, this initial leakage will serve to carry the ring into wedging engagement with the lip, as indicated in Fig. 4. Therefore, by the time the bowl 7 is up to full speed the compressible sealing ring 30 will make an extremely liquid tight seal, thereby preventing escape of the liquid in any appreciable quantity, in spite of the high pressure developed within the bowl during the impregnating action. When the bowl 7 comes to rest, obviously the pressure holding the ring 30 in position will be released so that no difficulty will be encountered in removing the cover 16. The removal of the cover 16, however, leaves the sealing ring 30 in position to again seal the bowl upon replacement of the cover and rotation of the bowl filled with the impregnating liquid.

In the previous discussion of the operation which causes impregnation of articles 24 in the cage 23, it was assumed that the bowl 7 was initially filled with the impregnating liquid from the pipe 18, the valve 19 being practically closed during the rotation of the bowl 7 since the cover seal prevents any appreciable leakage of the liquid once the pressure has been built up. When impregnating certain types of articles, however, it has been found desirable to vary the procedure to the extent of automatically causing the bowl 7 to empty itself of liquid without interrupting its rotation, with advantageous results, which will hereinafter appear.

To this end, the cover 16 is provided with a series of openings 31 each having a removable closure 32, the openings being arranged just above the lip 29. When it is desired to cause the bowl 7 to automatically empty itself, the desired number of openings 31 is exposed, after which the cover 16 is locked in position with the articles in the bowl 7, the valve 19 opened and the machine started. As the pressure builds up in the liquid, it is obvious that centrifugal force will serve to expel the liquid from the bowl through the openings 31 which by-pass the sealing ring 30. After the bowl 7 has come up to speed, the control valve 19 is turned so as to supply just enough liquid through the pipe 18 to a little more than compensate for the loss of liquid through the openings 31 and the amount of liquid absorbed by the articles. With this mode of operation, the pressure developed in the bowl 7 by centrifugal force is just the same as when operating with a sealed bowl, and the circulation of liquid by the pump 21 insures a continuous supply through the pipe 18 from the tank 20.

After the desired degree of impregnation has been obtained, the valve 19 is closed with the bowl 7 still rotating, whereupon the bowl starts to empty itself through the openings 31. Obviously, as long as any liquid remains in the bowl, it will tend to climb up the walls of the bowl and be expelled through the openings 31, until finally the bowl will be entirely emptied. When this condition is reached, continued rotation of the bowl with the impregnated articles 24 therein will cause the articles to be subjected to a draining action tending to expel excess liquid contained within the articles themselves. This expulsion of entrained liquid has been found to increase the impregnating action in effect, due to the fact that it really reverses the flow of the impregnating liquid through each article until all excess liquid is expelled. Therefore, when the empty bowl is finally brought to rest, the impregnated articles in the cage will be completely impregnated and excess liquid drained therefrom. Obviously, automatic emptying of the bowl 7 can also be obtained by providing an imperfect seal between the bowl 7 and cover 16, as by utilizing a sealing ring 30 of more or less permeable material, or material having surface channels, such as twisted metal cable.

From the foregoing, it is apparent that by the present invention there is provided an improved method and means for impregnating articles of various kinds by various liquids in which the articles to be impregnated are submerged. In the practice of the invention, the articles are subjected to high pressure developed in the impregnating liquid by centrifugal force as the body of liquid with the articles therein rotates at high speed. The pressure developed in the liquid against the walls of the bowl containing the articles acts in such a manner that the impregnating liquid works radially inward from the region of greatest pressure so as to completely expel any air in the articles. Furthermore, the rotating bowl and its driving means, being movable as a unit about a pivotal axis, is subjected to periodic displacements which have the effect of setting up a pulsating pressure increasing the degree of impregnation. In practice it has been found that a "breathing" effect is produced by the varying centrifugal force at different speeds and diameters which is effective in obtaining complete impregnation. An additional advantageous feature of the invention resides in the ability of the apparatus to automatically discharge all of the impregnating liquid while the bowl is rotating, which results in the liquid retraversing the interior of the articles under treatment and the expulsion of excess treating liquid from the articles.

I claim,

1. A method of treating articles with a liquid for the purpose of impregnating the articles, which comprises rotating a closed receptacle containing the liquid with the articles submerged and positioned therein to build up a hydro-static pressure acting to force the liquid through the articles in toward the axis of rotation of said receptacle.

2. A method of treating articles with a liquid for the purpose of impregnating the articles, which consists in subjecting the articles to a pulsating hydro-static pressure developed within a body of liquid by centrifugal force 3. The improvement in the treatment of articles with a liquid for the purpose of impregnating the articles, which consists in rotating at high speed a closed receptacle containing a body of liquid with the articles submerged therein to build up a hydro-static pressure within the liquid, the said receptacle being subjected to periodic lateral displacement while rotating to cause pulsations of the hydro-static pressure.

4. The improvement in the treatment of articles with a liquid for the purpose of impregnating the articles, which comprises rotating at high speed a closed receptacle containing a liquid with the articles submerged and positioned therein to cause penetration of the articles by the action of hydro-static pressure developed within the enclosed liquid in forcing the liquid through the articles in towards the axis of rotation of said receptacle and then discharging the liquid from the rotating receptacle for the purpose of expelling liquid from the impregnated articles by centrifugal action.

5. A method of treating articles with a liquid for the purpose of impregnating the articles, which comprises rotating a closed receptacle containing the liquid to build up a hydro-static pressure, with the articles submerged in the liquid and so positioned within the zone of greatest hydro-static pressure as to cause complete penetration of the articles by passage of the liquid through the articles in towards the axis of rotation of said receptacle.

6. A method of treating loose, relatively porous articles with a liquid for the purpose of impregnating the articles, which comprises rotating a closed receptacle containing the liquid with the articles submerged therein and positioned close to the wall of said receptacle where the hydro-static pressure developed within the liquid is the greatest and serves to force the liquid through the articles in towards the axis of rotation of said receptacle.

WILLIAM A. HYDE.